United States Patent
Okada et al.

(10) Patent No.: US 10,604,665 B2
(45) Date of Patent: Mar. 31, 2020

(54) NEAR INFRARED ABSORBING FINE PARTICLE DISPERSION LIQUID AND METHOD FOR PRODUCING THE SAME, ANTI-COUNTERFEIT INK COMPOSITION USING NEAR INFRARED ABSORBING FINE PARTICLE DISPERSION LIQUID, AND ANTI-COUNTERFEIT PRINTED MATTER USING NEAR INFRARED ABSORBING FINE PARTICLES

(71) Applicant: SUMITOMO METAL MINING CO., LTD., Tokyo (JP)

(72) Inventors: Mika Okada, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/546,923

(22) PCT Filed: Jan. 27, 2016

(86) PCT No.: PCT/JP2016/052399
§ 371 (c)(1),
(2) Date: Jul. 27, 2017

(87) PCT Pub. No.: WO2016/121841
PCT Pub. Date: Aug. 4, 2016

(65) Prior Publication Data
US 2018/0016450 A1    Jan. 18, 2018

(30) Foreign Application Priority Data
Jan. 27, 2015    (JP) .................................. 2015-012896

(51) Int. Cl.
*C09D 11/037*    (2014.01)
*C09D 11/50*    (2014.01)
(Continued)

(52) U.S. Cl.
CPC ............. *C09D 11/037* (2013.01); *B41M 3/14* (2013.01); *B42D 25/382* (2014.10); *C09D 11/50* (2013.01);
(Continued)

(58) Field of Classification Search
USPC ........ 524/404; 252/587, 582; 106/31.33, 31, 106/34, 31.34
See application file for complete search history.

(56) References Cited

U.S. PATENT DOCUMENTS 7,282,164 B2 * 10/2007 Hall ........................ G06F 3/014
252/587
2008/0182930 A1    7/2008 Adachi
(Continued)

FOREIGN PATENT DOCUMENTS

| CN | 102079895 | * | 6/2011 |
| FR | 2981359 | * | 4/2013 |

(Continued)

OTHER PUBLICATIONS

English abstract of FR 2981359, Apr. 19, 2013, France.*
(Continued)

*Primary Examiner* — Tae H Yoon
(74) *Attorney, Agent, or Firm* — Oliff PLC

(57) ABSTRACT

Provided are a near infrared absorbing fine particle dispersion liquid having an absorption ability in a near infrared region, a clear contrast, and applicable to offset printing, and a method for producing the same, an anti-counterfeit ink composition using the near infrared absorbing fine particle dispersion liquid and an anti-counterfeit printed matter using near infrared absorbing fine particles. Also provided are a near infrared absorbing fine particle dispersion liquid containing a solvent of one or more kinds selected from vegetable oils or vegetable oil-derived compounds; near infra-
(Continued)

red absorbing fine particles in an amount of 2 mass % or more and 25 mass % or less, selected from one or more kinds of hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$); and a dispersant soluble in the solvent and having a fatty acid in its structure, wherein viscosity is 180 mPa/S or less, and an anti-counterfeit ink composition containing the near infrared absorbing fine particle dispersion liquid. Also provided is an anti-counterfeit printed matter excellent in anti-counterfeit effect due to the printed matter containing the near infrared absorbing fine particles.

5 Claims, 4 Drawing Sheets

(51) Int. Cl.
  *C08K 3/38* (2006.01)
  *B42D 25/382* (2014.01)
  *B41M 3/14* (2006.01)
  *C09D 17/00* (2006.01)
  *C09K 3/00* (2006.01)
  *C01B 35/04* (2006.01)
  *C01F 17/00* (2020.01)

(52) U.S. Cl.
  CPC ............ *C09D 17/00* (2013.01); *C09K 3/00* (2013.01); *C01B 35/04* (2013.01); *C01F 17/00* (2013.01)

(56) References Cited

U.S. PATENT DOCUMENTS

| | | |
|---|---|---|
| 2008/0311308 A1 | 12/2008 | Lee et al. |
| 2009/0029121 A1 | 1/2009 | Hammermann et al. |
| 2010/0178471 A1 | 7/2010 | Adachi |
| 2011/0230603 A1 | 9/2011 | Yoda et al. |

FOREIGN PATENT DOCUMENTS

| | | | |
|---|---|---|---|
| JP | H04-320466 A | | 11/1992 |
| JP | H11-181336 A | | 7/1999 |
| JP | 2000-096034 A | | 4/2000 |
| JP | 2000-309736 A | | 11/2000 |
| JP | 2004-168842 A | | 6/2004 |
| JP | 2006-143778 A | | 6/2006 |
| JP | 2008-509271 A | | 3/2008 |
| JP | 2008-169294 A | | 7/2008 |
| JP | 2008-291167 A | | 12/2008 |
| JP | 2009108324 | * | 5/2009 |
| WO | WO 03/057785 | * | 7/2003 |
| WO | WO 2012/103578 | * | 8/2012 |

OTHER PUBLICATIONS

Apr. 26, 2016 Search Report issued in International Patent Application No. PCT/JP2016/052399.
Apr. 26, 2016 Written Opinion issued in International Patent Application No. PCT/JP2016/052399.
May 10, 2019 Office Action issued in Australian Patent Application No. 2016213101.

* cited by examiner

NEAR INFRARED ABSORBING FINE PARTICLE DISPERSION LIQUID AND METHOD FOR PRODUCING THE SAME, ANTI-COUNTERFEIT INK COMPOSITION USING NEAR INFRARED ABSORBING FINE PARTICLE DISPERSION LIQUID, AND ANTI-COUNTERFEIT PRINTED MATTER USING NEAR INFRARED ABSORBING FINE PARTICLES

This application is a national stage of PCT/JP2016/052399, filed Jan. 27, 2016, which claims priority to Japanese Patent Application No. 2015-012896, filed Jan. 27, 2015. The contents of the prior applications are incorporated by reference herein in their entireties.

TECHNICAL FIELD

The present invention relates to a near infrared absorbing fine particle dispersion liquid having absorption ability in a near infrared region and applicable to offset printing and a method for producing the same, an anti-counterfeit ink composition using the near infrared absorbing fine particle dispersion liquid, and an anti-counterfeit printed matter using the near infrared absorbing fine particles. In the present invention, the "near infrared absorbing fine particles" and the "near infrared absorbing material fine particles" in the prior application based on the priority right are the same fine particles.

DESCRIPTION OF RELATED ART

There are various kinds of printing technologies depending on the purpose and the like. Among them, offset printing enables high-precision printing and has characteristics that it is suitable for mass printing. In the offset printing, the following properties are required: a pigment dispersion liquid to be used based on its printing principle is lipophilic and does not dissolve a rubber blanket to which the dispersion liquid is transferred during the offset printing.

Meanwhile, in recent years, for example, for the purpose of prevention of counterfeiting and the like, the following matter is studied. Data is printed on various tickets, certificates and the like using a pigment having an infrared absorbing material, and the data is read by an infrared judging device or the like to thereby manage various information.

In such an application, a large amount of data is printed on a large amount of paper medium, and therefore use of the offset printing as a printing method has been studied.

Also, when an infrared absorbing material is transparent in a visible light region, it can not be distinguished visually that the infrared absorbing material is printed as a pigment. This is preferable from a viewpoint of prevention of counterfeiting and the like, and is also preferable from a viewpoint of visibility and a beautiful appearance because it does not visually obstruct an original print display.

As an example using the infrared absorbing material, patent document 1 proposes an anti-counterfeit printed matter using a phthalocyanine compound.

Further, patent document 2 proposes an anti-counterfeit printed matter using tin-doped indium oxide.

Meanwhile, inventors of the present invention disclose a coating solution for a selectively permeable membrane in which hexaboride fine particles are dispersed in an organic solvent, using the hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca) as a material having high visible light transmittance and near infrared absorbing function, in patent document 3 and patent document 4. Further the inventors of the present invention disclose an anti-counterfeit ink in which an anti-counterfeit ink composition containing the hexaboride fine particles is dispersed in a solvent as a near infrared absorbing material, in patent document 5.

[Patent Document 1] Japanese Patent Application Laid-Open Publication No. 1992-320466
[Patent Document 2] Japanese Patent Application Laid-Open Publication No. 2000-309736
[Patent Document 3] Japanese Patent Application Laid-Open Publication No. 1999-181336
[Patent Document 4] Japanese Patent Application Laid-Open Publication No. 2000-96034
[Patent Document 5] Japanese Patent Application Laid-Open Publication No. 2004-168842

SUMMARY OF THE INVENTION

Problem to be Solved by the Invention

According to studies by the inventors of the present invention, an organic pigment such as a phthalocyanine compound used in patent document 1 has a problem as follows, An infrared absorption property is changed due to an influence of temperature, ultraviolet rays or the like, and durability is inferior.

Further, the infrared absorbing material using tin-doped indium oxide, which is used in patent document 2, has insufficient contrast of a visible light that exists in a wavelength region for transmitting and reflecting the light, and an infrared light that exists in a wavelength region for absorbing the light. Therefore, when the near infrared absorbing fine particle dispersion liquid using the tin-doped indium oxide is applied to the offset printing, there is a problem that reading accuracy of a printing section and the like are deteriorated.

In contrast, in the selectively permeable membrane coating solution and anti-counterfeit ink described in patent documents 3 to 5, the near infrared absorbing fine particles are dispersed in an organic solvent such as ethanol or toluene. Therefore, in these coating solutions and inks, there is a possibility that the organic solvent dissolves the rubber blanket, and therefore they cannot be used as the ink for offset printing.

Therefore, the inventors of the present invention attempt to obtain a dispersion liquid by using vegetable oils or vegetable oil-derived compounds as a solvent for offset printing, and adding to the solvent hexaboride fine particles expressed by a general formula $XB_a$ (wherein element X is at least one or more kinds selected from a group consisting of La, Ce, Pr, Nd, Gd, Tb, Dy, Ho, Y, Sm, Yb, Lu, Sr, and Ca, satisfying $4.0 \leq a \leq 6.2$). However, it is found that there is a problem that viscosity of the obtained dispersion liquid is increased and it is difficult to pulverize the hexaboride fine particles or disperse the hexaboride fine particles in the solvent.

Under such a circumstance, the present invention is provided, and an object of the present invention is to provide a near infrared absorbing fine particle dispersion liquid having an absorption ability in a near infrared region, a clear contrast, and applicable to offset printing, and a method for producing the same.

Further, an object of the present invention is to provide an anti-counterfeit printed matter enabling the offset printing, which is impossible to be duplicated in copying and the like, and whose authenticity can be mechanically and reliably judged not depending on a visual judgment, having few restrictions in design, and excellent in anti-counterfeit effect, by using the anti-counterfeit ink composition containing the near infrared absorbing fine particle dispersion liquid.

Means for Solving the Problem

In order to solve the above mentioned problem, an intensive research is performed by the inventors of the present invention, and as a result, it is found that instead of adding near infrared absorbing fine particles to a solvent of one or more kinds selected from vegetable oils or vegetable oil-derived compounds and pulverizing and dispersing them, the near infrared absorbing fine particles are added to a solvent of one or more kinds selected from alcohols, ethers, esters, ketones, aromatic hydrocarbons and glycol ethers and having a boiling point of 180° C. or less (referred to as "a first solvent" hereafter in some cases in the present invention), pulverized and dispersed therein, and further the first solvent is replaced with a solvent of one or more kinds selected from vegetable oils or vegetable oil-derived compounds (referred to as "a second solvent" hereafter in some cases in the present invention), to thereby obtain a near infrared absorbing fine particle dispersion liquid.

Further, the inventors of the present invention achieve an anti-counterfeit ink composition for offset printing containing a near infrared absorbing fine particle dispersion liquid as described above or containing a pigment commonly used in ordinary offset printing ink together with the above mentioned near infrared absorbing fine particle dispersion liquid, and an anti-counterfeit printed matter printed using the anti-counterfeit ink composition for offset printing. Thus, the present invention is completed.

Namely, in order to solve the above mentioned problem, a first invention is a near infrared absorbing fine particle dispersion liquid, containing:

a solvent of one or more kinds selected from vegetable oils or vegetable oil-derived compounds;

near infrared absorbing fine particles selected from one or more kinds selected from hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$); and a solvent of one or more kinds selected from alcohols, ethers, esters, ketones, aromatic hydrocarbons and glycol ethers and having a boiling point of 180° C. or less, wherein content of the solvent of one or more kinds selected from alcohols, ethers, esters, ketones, aromatic hydrocarbons and glycol ethers is 5 mass % or less.

A second invention is the near infrared absorbing fine particle dispersion liquid of the first invention, wherein the near infrared absorbing fine particle dispersion liquid further contains a dispersant which is soluble in the solvent of one or more kinds selected from the vegetable oils or vegetable oil-derived compounds and has a fatty acid in its structure, and a concentration of hexaboride in the near infrared absorbing fine particle dispersion liquid is 25 mass % or more and 75 mass % or less, A third invention is the near infrared absorbing fine particle dispersion liquid of the second invention, wherein an anchor portion of the dispersant has one or more kinds selected from a secondary amino group, a tertiary amino group, and a quaternary ammonium group.

A fourth invention is the near infrared absorbing fine particle dispersion liquid of the second or third invention, wherein the dispersant has an acid value of 1 mg KOH/g or more.

A fifth invention is the near infrared absorbing fine particle dispersion liquid of any one of the first to fourth inventions, wherein a dispersed particle size of each near infrared absorbing fine particle is 1 nm or more and 200 nm or less.

A sixth invention is the near infrared absorbing fine particle dispersion liquid of any one of the first to fifth inventions, wherein a lattice constant of each near infrared absorbing fine particle is 0.4100 nm or more and 0.4160 nm or less.

A seventh invention is the near infrared absorbing fine particle dispersion liquid of any one of the first to sixth inventions, wherein a surface of the near infrared absorbing fine particle is coated with a compound of one or more kinds selected from Si, Ti, Al, and Zr.

An eighth invention is the near infrared absorbing fine particle dispersion liquid of any one of the first to seventh inventions, the vegetable oil is one or more kinds of vegetable oils selected from drying oil and semidrying oil.

A ninth invention is the near infrared absorbing fine particle dispersion liquid of any one of the first to eighth inventions, wherein the near infrared absorbing fine particle dispersion liquid further contains a binder.

A tenth invention is a method for producing the near infrared absorbing fine particle dispersion liquid, including:

mixing and dispersing near infrared absorbing fine particles of one or more kinds selected from hexaboride fine particles expressed by a general formula $XB_6$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$) in a solvent of one or more kinds selected from alcohols, ethers, esters, ketones, aromatic hydrocarbons and glycol ethers and having a boiling point of 180° C. or less, to thereby obtain a first dispersion liquid;

adding and mixing a solvent of one or more kinds selected from vegetable oils and vegetable oil-derived compounds in the first dispersion liquid, to thereby obtain a second dispersion liquid; and removing from the second dispersion liquid the solvent of one or more kinds selected from alcohols, ethers, esters, ketones, aromatic hydrocarbons and glycol ethers and having a boiling point of 180° C. or less, so that the content of the solvent becomes 5 mass % or less.

An eleventh invention is the method for producing the near infrared absorbing fine particle dispersion liquid of the tenth invention, wherein a concentration of the near infrared absorbing fine particles in the first dispersion liquid is 5 mass % or more and 50 mass % or less.

A twelfth invention is a method for producing a near infrared absorbing fine particle dispersion liquid, including:

mixing a solvent of one or more kinds selected from alcohols, ethers, esters, ketones, aromatic hydrocarbons and glycol ethers and having a boiling point of 180° C. or less, and a solvent of one or more kinds selected from vegetable oils or vegetable oil-derived compounds, to thereby obtain a mixed solvent; and mixing and dispersing in the mixed solvent the near infrared absorbing fine particles of one or more kinds selected form hexaboride fine particles expressed by a general formula $XB_a$ (wherein element X is at least one or more kinds selected from a group consisting of La, Ce, Pr, Nd, Gd, Tb, Dy, Ho, Y, Eu, Er, Tm, Yb, Lu, Sr, and Ca, satisfying 4.0≤a≤6.2), to thereby obtain a third dispersion liquid; and removing from the third dispersion liquid the solvent of one or more kinds selected from alcohols, ethers, esters, ketones, aromatic hydrocarbons and glycol ethers and having a boiling point of 180° C. or less, so that the content of the solvent becomes 5 mass % or less.

A thirteenth invention is the method for producing the near infrared absorbing fine particle dispersion of the twelfth invention, wherein a concentration of the near infrared absorbing fine particles in the third dispersion liquid is 5 mass % or more and 50 mass % or less.

A fourteenth invention is the method for producing the near infrared absorbing fine particles of any one of the tenth to thirteenth inventions, wherein a dispersant which is soluble in the solvent and has a fatty acid in its structure is added to the solvent of at least one or more kinds selected from the vegetable oils or vegetable oil-derived compounds.

A fifteenth invention is an anti-counterfeit ink composition, containing the near infrared absorbing fine particles of any one of the first to ninth inventions A sixteenth invention is the anti-counterfeit ink composition of the fifteenth invention, further containing a pigment.

A seventeenth invention is an anti-counterfeit ink composition, wherein the pigment of the sixteenth invention is an inorganic pigment, and is one or more kinds selected from carbon black, white pigment, an extender pigment, a red pigment, a yellow pigment, a green pigment, a blue pigment, a purple pigment, a fluorescent pigment, a temperature indicating pigment, a pearl pigment, and a metal powder pigment.

An eighteenth invention is an anti-counterfeit ink composition, wherein the pigment of the sixteenth invention is an organic pigment and is one or more kinds selected from an azo lake pigment, an insoluble azo pigment, a condensed azo pigment, a phthalocyanine pigment, and a condensed polycyclic pigment.

A nineteenth invention is the anti-counterfeit ink composition of any one of the fifteenth to eighteenth inventions, containing one or more kinds selected from a plasticizer, an antioxidant, a thickener, and a wax.

A twentieth invention is an anti-counterfeit printed matter, having a printed pattern on one side or both sides of a base material, and containing near infrared absorbing fine particles of one or more kinds selected from hexaboride fine particles expressed by a general formula $XB_a$ (wherein element X is at least one or more kinds selected from a group consisting of La, Ce, Pr, Nd, Gd, Tb, Dy, Ho, Y, Sm, Eu, Er, Tm, Yb, Lu, Sr, and Ca, satisfying 4.0≤a≤6.2), in the printed pattern.

A twenty-first invention is the anti-counterfeit printed matter of the twentieth invention, wherein the printed pattern further contains a pigment A twenty-second invention is the anti-counterfeit printed matter of the twenty-first invention, wherein a pigment is an inorganic pigment and is one or more kinds selected from carbon black, white pigment, an extender pigment, a red pigment, a yellow pigment, a green pigment, a blue pigment, a purple pigment, a fluorescent pigment, a temperature indicating pigment, a pearl pigment, and a metal powder pigment.

A twenty-third invention is the anti-counterfeit printed matter of the twenty-first invention, wherein a pigment is an organic pigment, and is one or more kinds selected from an azo lake pigment, an insoluble azo pigment, a condensed azo pigment, a phthalocyanine pigment, and a condensed polycyclic pigment.

A twenty-fourth invention is the anti-counterfeit printed matter of any one of the twentieth to twenty-third inventions, wherein a value obtained by dividing an average value of a diffuse reflectance of the anti-counterfeit printed matter in a wavelength range of 800 nm to 1300 nm, by an average value of a diffuse reflectance of a blank not containing near infrared absorbing fine particles in a wavelength range of 800 nm to 1300 nm, is 0.84 or less.

Advantage of the Invention

By using the near infrared absorbing fine particle dispersion liquid of the present invention, it is possible to easily perform offset printing having an absorption ability in a near infrared region and a clear contrast. Further, by using the near infrared absorbing fine particle dispersion liquid of the present invention, it is possible to provide an anti-counterfeit ink composition enabling offset printing, and an anti-counterfeit printed matter which is impossible to be duplicated in copying and the like, and whose authenticity can be judged mechanically and reliably not depending on a visual judgment, having few restrictions in design, and excellent in anti-counterfeit effect.

DETAILED DESCRIPTION OF THE INVENTION

Figure 1:
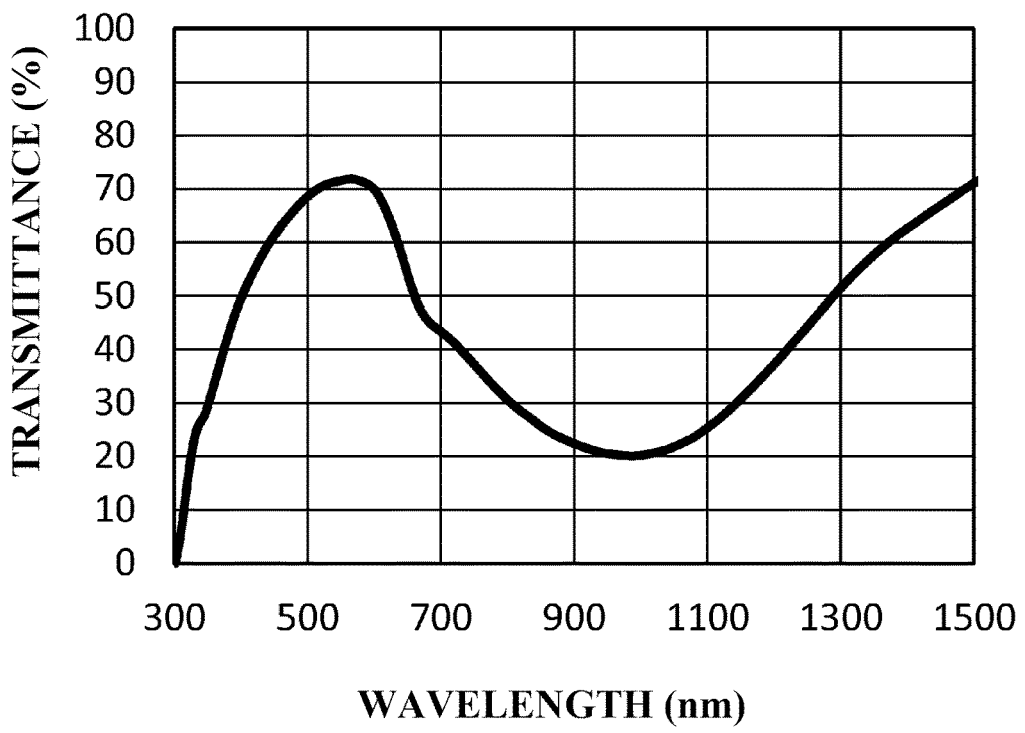
FIG. 1 is a light transmission profile of a dried film of a dispersion liquid B according to the present invention.

Embodiment of the present invention will be described in detail in an order of near infrared absorbing fine particles, a solvent, a dispersant, a method for dispersing near infrared absorbing fine particles in the solvent, a near infrared absorbing fine particle dispersion liquid, an anti-counterfeit ink composition for offset printing, a printing method, and an authenticity judging method.

1. Near infrared absorbing fine particles

The near infrared absorbing fine particles used in the present invention are hexaboride fine particles expressed by a general formula $XB_a$ (4.0≤a≤6.2). Wherein, element X is at least one or more kinds selected from La, Ce, Pr, Nd, Gd, Tb, Dy, Ho, Y, S Eu, Er, Tm, Yb, Lu, Sr and Ca.

Specifically, it is preferable to use one or more kinds selected from lanthanum hexaboride $LaB_6$, cerium hexaboride $CeB_6$, praseodymium hexaboride $PrB_6$, neodymium hexaboride $NdB_6$, hexadentate gadolinium $GdB_6$, terbium hexaboride $TbB_6$, dysprosium hexaboride $DyB_6$, holmium hexaboride $HoB_6$, yttrium hexaboride $YB_6$, samarium hexaboride $SmB_6$, europium hexaboride $EuB_6$, erbium hexaboride $ErB_6$, thulium hexaboride $TmB_6$, ytterbium hexaboride $YbB_6$, lutetium hexaboride $LuB_6$, lanthanum hexaboride cerium $(La, Ce)B_6$, strontium hexaboride $SrB_6$, and calcium hexaboride $CaB_6$.

It is preferable that a surface of each hexaboride fine particle is not oxidized. However, its surface is usually slightly oxidized in many cases, and it is inevitable to some extent that oxidation occurs on the surface in a fine particle dispersing step. Even in that case, there is no change in effectiveness of developing a heat ray shielding effect, and accordingly it is possible to use even the hexaboride fine particle whose surface is oxidized.

Further, the abovementioned hexaboride fine particles have a higher heat ray shielding effect as crystallinity becomes higher. Even if the hexaboride fine particles have low crystallinity and produce broad diffraction peaks by X-ray diffraction, a desired heat ray shielding effect can be exhibited when a basic bond inside the fine particle is composed of a bond between each metal and boron and a lattice constant is 0.4100 nm or more and 0.4160 nm or less, and therefore the hexaboride fine particles can be preferably used in the present invention. The lattice constant can be obtained by conducting a Rietveld analysis based on data of an XRD pattern, for example.

It is also preferable that the surface of the hexaboride fine particle is coated with a silane coupling agent. Since the surface of hexaboride fine particle is coated with a silane coupling agent, excellent dispersibility of hexaboride fine particles can be obtained. This is because in the near infrared absorbing fine particle dispersion liquid of the present invention, excellent near infrared absorbing function and transparency in the visible light region can be obtained as a result of the excellent dispersibility.

In a film in which the hexaboride fine particles of the present invention are sufficiently finely and uniformly dispersed, it is observed that a light transmittance has a maximum value between wavelengths 400 nm and 700 nm and has a minimum value between wavelengths 700 nm and 1800 nm, and further a difference between the maximum value and the minimum value in the transmittance of the light is 15 points or more.

A wavelength of a visible light is 380 nm to 780 nm and a human visibility takes a bell-type form with its peak at around 550 nm wavelength. When this is taken into consideration, it is found that such a heat ray shielding transparent resin molded product effectively transmits visible lights and effectively reflects and absorbs other heat rays.

The hexaboride fine particles of the present invention largely absorb a light in a near ultraviolet region near a wavelength range of 350 to 400 nm and in the near infrared region near a wavelength range of 650 to 1300 nm, and particularly a light near a wavelength of 1000 nm. Therefore, a transmission color tone is from colorless to greenish in many cases.

Further, the dispersed particle size of each hexaboride fine particle of the present invention can be selected according to the intended use, For example, in order for the hexaboride fine particles of the present invention to exhibit absorption in the near infrared region, it is preferable to sufficiently decrease a dispersed particle size of each hexaboride fine particle. This is because absorption by hexaboride is caused by localized surface plasmon resonance which is a phenomenon peculiar to nanoparticles. Here, the dispersed particle size means an aggregated particle size of boride fine particles in a solvent, and it can be measured using various commercially available particle size distribution meters. For example, sampling is performed from a dispersion liquid in which boride fine particles are dispersed in a solvent, with aggregates of boride fine particles also present therein, so that the dispersed particle size can be measured using ELS-800 manufactured by Otsuka Electronics Co., Ltd. based on a principle of dynamic light scattering method. For example, when the dispersed particle size is 1500 nm or less, the hexaboride fine particles have absorption in the near infrared region. Then, when the dispersed particle size of the hexaboride fine particles is about 800 nm or less, the absorption in the near infrared region becomes strong, and when it is 200 nm or less, stronger absorption is exhibited, and when it is 100 nm or less, further stronger absorption is exhibited.

On the other hand, in the hexaboride fine particles of the present invention, transparency/non-scattering property in the visible light region can be obtained by suppressing a light scattering caused by the fine particles. As the light scattering, there are geometric optical scattering, Mie scattering, and Rayleigh scattering, depending on the ratio of the particle size to a light wavelength.

In a case of the visible light, geometric optical scattering can be almost ignored as long as the dispersed particle size of each hexaboride fine particle is 1000 nm or less. Then, when the dispersed particle size is 200 nm or less, Mie scattering is weakened, and when it is 100 nm or less, further weakening is achieved. Rayleigh scattering is a main scattering factor in a region where the dispersed particle size of the fine particle is further smaller. Then, Rayleigh scattering intensity is decreased in inverse proportion to sixth power of the dispersed particle size, and therefore the scattering light can be reduced by further decreasing the dispersed particle size of the fine particles, and this is preferable.

The hexaboride fine particle dispersion liquid of the present invention is used as a raw material for anti-counterfeit ink for offset printing, and when this is further taken into consideration in view of the above matter, the dispersed particle size of the hexaboride fine particle of the present invention is preferably 200 nm. or less. This is because when the dispersed particle size is 200 nm or less, near infrared absorption of hexaboride by localized surface plasmon resonance is sufficiently exhibited and light scattering of the visible light is sufficiently reduced, and therefore the contrast of [reflection/absorption] or [transmission/absorption] of the light reflected by the surface of the printed matter or the light transmitted through the printed matter, is improved. On the other hand, when the dispersed particle size is 1 nm or more, industrial production is easy.

It is preferable that the surface of the hexaboride fine particle of the present invention is coated with an oxide containing at least one or more kinds of Si, Ti, Zr and Al, from a viewpoint of improving a weather resistance of the hexaboride fine particles.

2. Solvent

<First Solvent>

A first solvent used in the present invention is a solvent suitable for pulverizing the hexaboride of the present invention into fine particles and dispersing it in the solvent.

Specifically, it is preferable to use each kind of solvent such as alcohols such as ethanol, propanol, butanol, isopropyl alcohol, isobutyl alcohol and diacetone alcohol, ethers such as methyl ether, ethyl ether and propyl ether, esters, ketones such as acetone, methyl ethyl ketone, diethyl ketone, cyclohexanone, ethyl isobutyl ketone, methyl isobutyl ketone, aromatic hydrocarbons such as toluene, xylene and benzene, and glycol ethers such as propylene glycol monomethyl ether acetate and propylene glycol monoethyl ether, and having affinity with a second solvent described In addition to this point of view, solvents such as alcohols and glycol ethers are low in health hazard to a human body, and are preferable solvents from a viewpoint of safety in the process and operability. Further, methyl isobutyl ketone and toluene are preferable solvents excellent in workability and are preferable solvents from a viewpoint of improving productivity.

Offset printing is a printing method that utilizes a property that water and oil repel each other, and a plate is made up of a lipophilic layer to which printing ink is applied and a new water layer to which water is applied and printing ink is not applied. Therefore, offset printing ink and water are required to be hardly soluble each other. Among the first solvents, alcohols and glycol ethers are highly polar and easily soluble in water, and therefore in the offset printing ink, a predetermined amount or less of alcohols and glycol ethers are required to be contained. Specifically, the content of alcohols and glycol ethers is preferably 1.0 mass % or less.

Further, although solvents other than alcohols and glycol ethers are poor in polarity and hardly soluble in water, they may possibly dissolve a rubber blanket to which a dispersion liquid of fine particles is transferred during offset printing, and therefore in the offset printing ink, a predetermined amount or less of them are required to be contained. Specifically, the content of them are preferably 1.0 mass % or less.

Accordingly, after pulverizing the hexaboride of the present invention into fine particles and dispersing them in a solvent, it is preferable that the content of the first solvent is sufficiently reduced.

Specifically, it is conceivable that a solvent having a low boiling point is used as the first solvent, a difference in boiling point is provided between the first solvent and the second solvent, and the content of the first solvent is reduced by heating distillation.

When a solvent substitution by heating distillation is performed, it is preferable to use a solvent having a boiling point of 180° C. or less, as the first solvent.

<Second Solvent>

The second solvent used in the present invention is required to be water-insoluble and not dissolve the rubber blanket used in the offset printing. Specifically, the solvent of one or more kinds selected from vegetable oils and vegetable oil-derived compounds can be used.

Drying oils such as linseed oil, sunflower oil and tung oil, semidrying oils such as sesame oil, cottonseed oil, rapeseed oil, soybean oil, rice bran oil, non-drying oils such as olive oil, coconut oil, palm oil, dehydrated castor oil and the like, can be used as vegetable oils. Fatty acid monoesters or ethers obtained by directly esterifying fatty acid of vegetable oil and monoalcohol, can be used as the vegetable oil-derived compounds.

The abovementioned vegetable oils and vegetable oil-derived compounds have double bonds in fatty acid which is a constituent component of oil and fat contained therein. Such a double bond reacts with oxygen in the air, whereby a polymerization reaction proceeds between the molecules of the fat/oil having the double bond, and between fat/oil having the double bond and a pigment component having the double bond. The polymerization reaction proceeds by polymerization of the molecules of the oil and fat and polymerization of oil and fat with pigment components or the like for offset printing, to thereby solidify a coating film after offset printing.

The solidification of the coating film after offset printing becomes faster as the number of double bonds in the fatty acid as a constituent component of the vegetable oils and the vegetable oil-derived compounds is larger, and the number of the double bonds in the fatty acid is evaluated by iodine value. Namely, the solidification of the coating film becomes faster as the iodine value of the vegetable oil-derived compounds or vegetable oils is higher. Here, the drying oil has an iodine value of 130 or more, the semidrying oil has 130 to 100, and the non-drying oil has 100 or less. Then, one or more kinds selected from semi-drying oil, drying oil such as linseed oil, sunflower oil, Lung oil and the like having an iodine value of 130 or more, are preferable, as the vegetable oils and the vegetable oil-derived compounds used for the offset. printing.

3. Dispersant

From a viewpoint of improving workability and operability, it is also preferable that by adding a dispersant to the first solvent and the second solvent in which the hexaboride fine particles of the present invention are dispersed, or to the first and second mixed solvents, the viscosity of the solvent is lowered. From a viewpoint of lowering the viscosity of the solvent, it is preferable that the added dispersant of the present invention has a fatty acid in its structure.

Specifically, the dispersant of the present invention is required to be soluble in the abovementioned first and second solvents of the present invention.

Further, when the acid value of the dispersant of the present invention is 1 mg KOH/g or more, this is preferable because the ability of dispersing the abovementioned near infrared absorbing fine particles in the solvent of the present invention is high. From this viewpoint, the structure of the dispersant of the present invention is not particularly limited, but it is preferable to use a polymer dispersant having a basic anchor portion. The anchor portion is a portion (group) in the molecule of the polymer dispersant and is a part (group) that is adsorbed on the surface of the near infrared absorbing fine particle.

In the present invention, when the polymer dispersant having particularly the basic anchor portion is used, storage stability of the ink is improved, which is preferable. As a basic part (group) serving as the anchor portion, there are parts (groups) such as a secondary amino group, a tertiary amino group, and a quaternary ammonium group.

Figure 5:
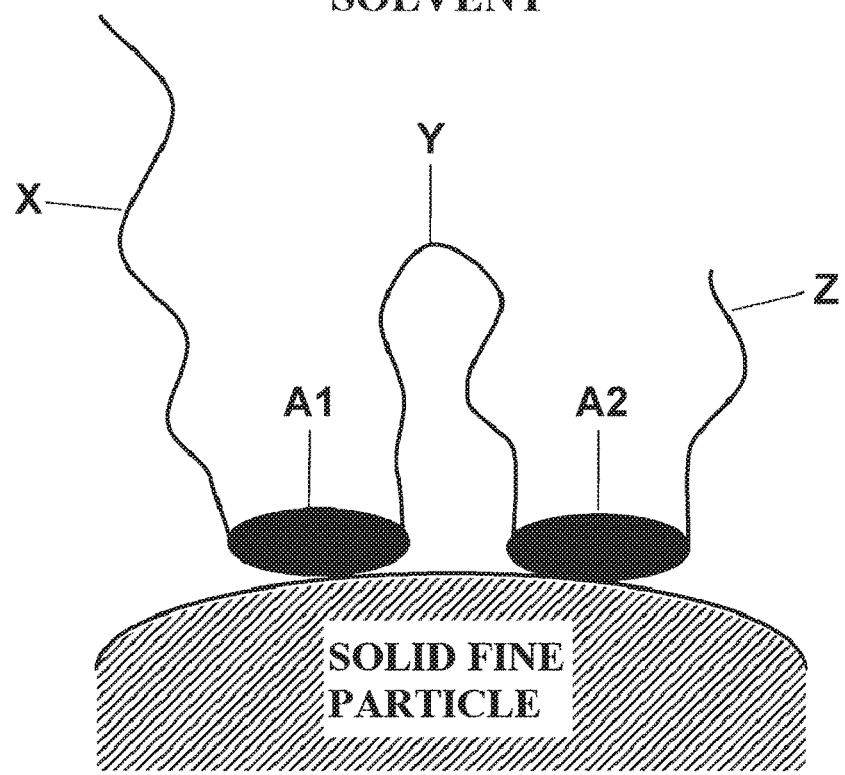
FIG. 5 is a schematic view of an aspect of a polymer dispersant used in the present invention.

An aspect of the polymer dispersant used in the present invention is shown in FIG. 5. In the general formula [X-A1-Y-A2-Z], A1 and A2 are portions (anchor portions) which are adsorbed on solid fine particles. In the anchor portion, its structure is not particularly limited as long as it has at least one point (adsorption point) to be adsorbed on each solid fine particle, and has a chain, cyclic, or fused polycyclic shape, or a combination thereof for example. Further, A1 and A2 may be the same or different. On the other hand, X, Y and Z are polymer chain portions which are solvated, and solved and spread out from the surface of the solid fine particle into a liquid, and hereinafter, X and Z are referred to as tail portions and Y is referred to as a loop portion. In the tail portions and the loop portion, a homopolymer composed of a single monomer and a copolymer composed of plural monomers are used.

Further, as the polymer dispersant used in the present invention, a substance having no loop portion (Y) in the general formula [X-A1-Y-A2-Z], can be used, which is synonymous with the general formula [X-A1-A2-Z].

Figure 6:
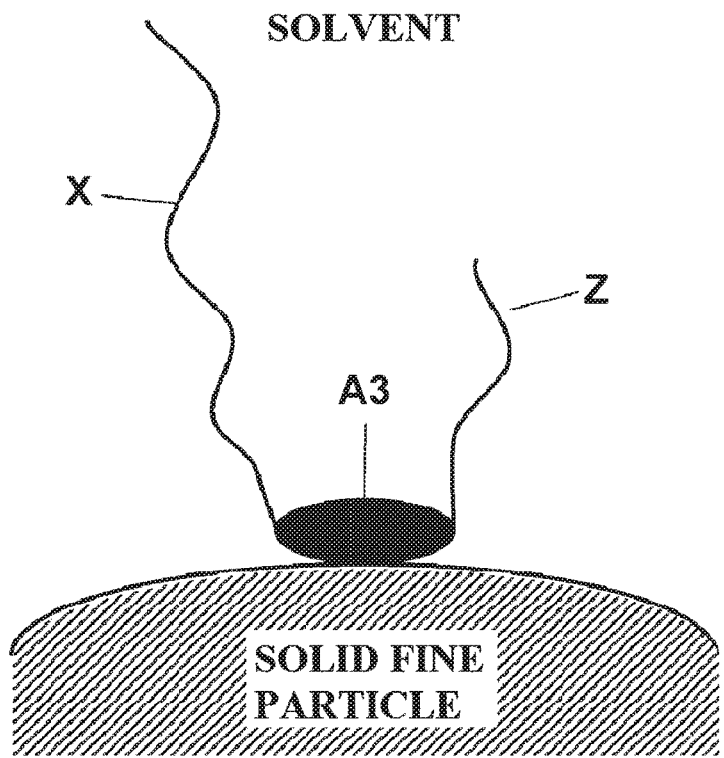
FIG. 6 is a schematic view of an aspect of another different polymer dispersant used in the present invention.

Still further, as an aspect of the polymer dispersant used in the present invention, there is also a structure in which Y shown in FIG. 6 does not exist and two tail portions are bonded to one anchor portion. in this ease, the general formula is [X-A3-Z].

Figure 7:
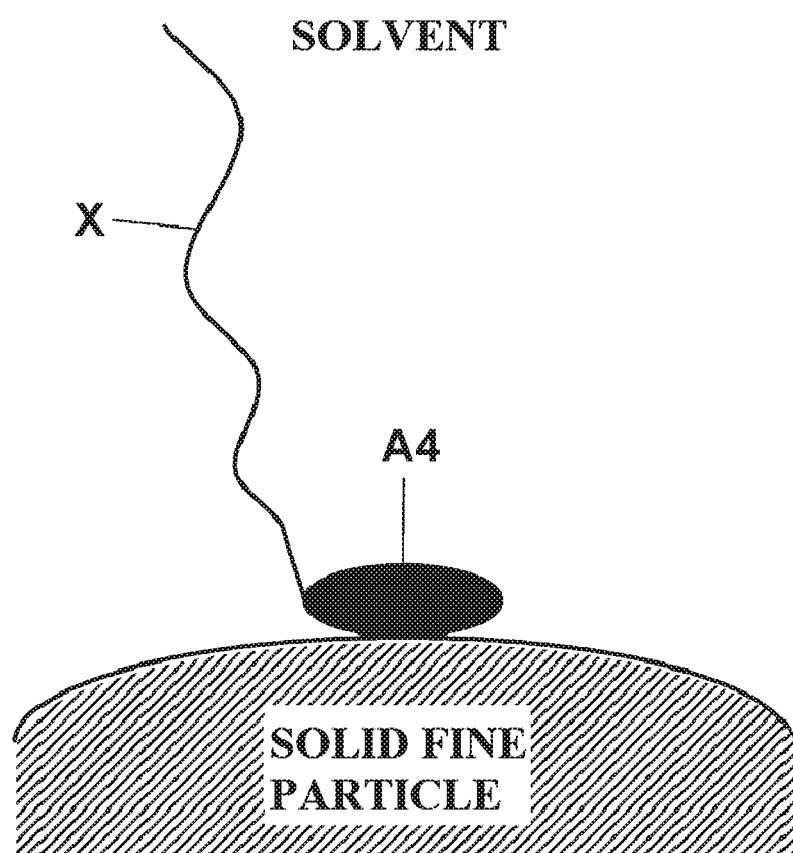
FIG. 7 is a schematic view of an aspect of further another different polymer dispersant used in the present invention.

In addition, as an aspect of the polymer dispersant used in the present invention, there is also a structure in which Z shown in FIG. 7 does not exist and one tail portion is bonded to one anchor portion, In this case, the general formula is [X-A4].

"A" constituting the polymer dispersant used in the present invention (in the present invention, A1, A2, A3, and A4 described above may be collectively referred to as "A" in some cases), has for example at least one adsorption point (functional group) having an adsorption interaction with the surface of the solid particle by hydrogen bonding or an acid-base interaction or the like, Further, although A1 an dA2 may be the same or different, A1 and A2 preferably have the same functional group as the functional group having the adsorption interaction at the adsorption point, in consideration of adsorptivity to the solid fine particles.

Next, X, Y and Z constituting the polymer dispersant used in the present invention may be composed of different chemical species, and at least two of them may be composed of the same chemical species. Since the tail portions and the loop portion are solvated portions which are solved and spread out from the surface of the solid fine particle into the liquid, the polymer chain having affinity with the solvent for dispersing the abovementioned solid fine particles is used.

The dispersant of the present invention exhibits a dispersing ability of ensuring fluidity of the dispersion liquid in which the hexaboride fine particles of the present invention are dispersed in an amount of 25 mass % or more and 75 mass % or less, by adding the dispersant in the solvent of one or more kinds selected from vegetable oils or vegetable oil-derived compounds.

In a case of a. commercially available dispersant as a specific example of a preferable dispersant, DISPERBYK 142; Disperbyk 160, Disperbyk 161, Disperbyk 162, Disperbyk 163, Disperbyk 166, Disperbyk 170, Disperbyk 180, Disperbyk 182, Disperbyk 184, Disperbyk 190, Disperbyk 2155 (All manufactured by BYK Japan K.K.); EFKA-46, EFKA-47, EFKA-48, EFKA-49 (all manufactured by BASF); SOLPSERSE 11200, Solsperse 13940, Soisperse 16000, Solsperse 17000, Solsperse 18000, Solsperse 20000, Solsperse 24000, Solsperse 27000, Solsperse 28000, Solsperse 32000, Solsperse 33000, Solsperse 39000, Solsperse 56000, Solsperse 71000 (manufactured by Lubrizol Japan); SOLPLUS Solplus D 530, Solplus DP 320, Solplus L 300, Solplus K 500, Solplus R 700 (all manufactured by Lubrizol Japan); Ajisper PB 711, Ajisper PA 111, Ajisper PB 811, Ajisper PW 911 (manufactured by Ajinomoto Co., Ltd.); Florel DOPA-15B, :Floren DOPA-22, Floren DOPA-17, Floren TG-730W, Floren G-700, Floren TG-720W (all manufactured by Kyoeisha Chemical Industry Co., Ltd.), etc., can be mentioned.

An addition amount of the dispersant of the present invention is preferably 30 parts by weight or more and 200 parts by weight or less based on 100 parts by weight of hexaboride fine particles.

When a commercially available dispersant is used, it is preferable that the dispersant does not contain a solvent that may possibly dissolve the rubber blanket for offset printing. Accordingly, a nonvolatile content (after heating at 180° C. for 20 minutes) of the dispersant is preferably high, for example, preferably 95% or more.

4. Method for Dispersing the Near Infrared Absorbing Fine Particles in the Solvent As described above, since the viscosity of the second solvent is high, it is difficult to disperse the hexaboride fine particles in the second solvent. Particularly, it is difficult for solvents such as tung oil to have a viscosity (24° C.) of 180 mPa/S or more.

Therefore, as a method for dispersing the near infrared absorbing fine particles in the solvent, a method for producing the first and second near infrared absorbing fine particle dispersion liquids can be considered. The method for producing the first and second near infrared absorbing fine particle dispersion liquids will be described hereafter.

(1) Method for Producing the First Near Infrared Absorbing Fine Particle Dispersion Liquid There is provided the method for producing the near infrared absorbing fine particle dispersion liquid, including:

mixing the hexaboride fine particles into the first solvent and performing dispersion treatment using a wet medium mill or the like to obtain a first dispersion liquid;

adding a solvent of one or more kinds selected from vegetable oils or vegetable oil-derived compounds to the first dispersion liquid and mixing them to obtain a second dispersion liquid; and removing the first solvent from the second dispersion liquid until a content of the first solvent becomes 5 mass % or less.

Explanation will be given hereafter in detail.

The dispersion method for obtaining the first dispersion liquid by dispersing the hexaboride fine particles of the present invention in the first solvent of one kind or more, can be arbitrarily selected as long as the fine particles are uniformly dispersed in the solvent. Specifically, it is preferable to use a wet medium mill such as a bead mill or a ball mill. The first solvent is a solvent having a boiling point of 180° C. or less, preferably a boiling point of 150° C. or less.

When the concentration of the hexaboride fine particles in the first dispersion liquid is 5 mass % or more, productivity in producing the anti-counterfeit ink composition for offset printing is excellent. In contrast, when the concentration of the hexaboride fine particles is 50 mass % or less, the viscosity of the first dispersion liquid is not excessively high, thus facilitating the pulverization and dispersion of the hexaboride fine particles.

From this viewpoint, the concentration of the hexaboride fine particles in the first dispersion liquid is preferably from 5 to 50 mass %, more preferably from 10 to 40 mass %, still more preferably from 20 to 30 mass %.

The second solvent of one or more kinds selected from the vegetable oils or the vegetable oil-derived compounds, is added and mixed into the first dispersion liquid in which the hexaboride fine particles are dispersed, to thereby obtain the second dispersion liquid. At this time, it is preferable to select the solvents which are soluble each other, as the first solvent and the second solvent.

When the mixing of the first dispersion liquid and the second solvent is performed in such a manner that the second solvent is 2.5 parts by weight or more based on 100 parts by weight of the hexaboride fine particles contained in the first dispersion liquid, the finally obtained fluidity of the near infrared absorbing fine particle dispersion liquid of the present invention is kept, recovery is facilitated, and productivity is maintained.

In contrast, when the second solvent is 270 parts by weight or less based on 100 parts by weight of the hexaboride fine particles contained in the first dispersion liquid, the concentration of hexaboride fine particles in the finally obtained near infrared absorbing fine particle dispersion liquid of the present invention is ensured. Therefore, it is possible to avoid adding a large amount of the near infrared absorbing fine particle dispersion liquid of the present invention, and it is possible to ensure the viscosity of the ink. As a result, viscosity adjustment is not required, the process is simplified and an increase in production cost can be avoided, which is preferable.

From the abovementioned viewpoint, the mixing of the first dispersion liquid and the second solvent is preferably performed in such a manner that the second solvent is 2.5 to 270 parts by weight, more preferably 70 to 270 parts by weight, and still more preferably 92 to 204 parts by weight based on 100 parts by weight of the hexaboride fine particles contained in the first dispersion liquid.

When increase of the viscosity of the first and second dispersion liquids is desired to be further suppressed in dispersing the hexaboride fine particles in the solvent of one or more kinds to obtain the first hexaboride fine particle dispersion liquid, and adding and mixing the second solvent of one or more kinds thereto to obtain the second dispersion liquid, it is also preferable to add the abovementioned dispersant. As a method for adding the dispersant, it is possible to employ methods such as (i) adding a dispersant to the first solvent, (ii) adding a dispersant to the second solvent in advance to prepare a dispersant solution and adding the dispersant solution to the first dispersion liquid (iii) adding a dispersant to the first dispersion liquid in parallel with the addition of the second solvent. In the ease of using the method of (i) adding a dispersant to the first solvent, a dispersant soluble in the first solvent is selected.

Next, the first solvent is removed from the second dispersion liquid and the content of the first solvent in the second dispersion liquid is adjusted to 5 mass % or less to obtain the near infrared absorbing fine particle dispersion liquid of the present invention, For removing the first solvent from the second dispersion liquid, a thermal distillation method using a difference in boiling points in the first and second solvents can be used. Further, according to a depressurization heating distillation method in which the depressurizing operation is also added to the heating distillation method, this is a preferable configuration. also from the viewpoint of safety, energy cost, and stabilization of quality.

(2) Method for Producing the Second Near Infrared Absorbing Fine Particle Dispersion Liquid There is provided a method for producing the near infrared absorbing fine particle dispersion liquid, including:

mixing the first solvent and the second solvent to obtain a mixed solvent;

mixing the hexaboride fine particles in the mixed solvent and performing dispersion treatment by a wet medium mill to obtain a third dispersion liquid; and removing the first solvent from the third dispersion liquid until the content of the first solvent becomes 5 mass % or less.

Explanation will be given hereafter in detail.

The abovementioned first solvent of one or more kinds and the second solvent of one or more kinds are previously mixed to obtain a mixed solvent. At this time, it is preferable to select the solvents which are soluble each other, as the first solvent and the second solvent. The dispersion method for obtaining the third dispersion liquid by dispersing the hexaboride fine particles of the present invention in this mixed solvent, can be arbitrarily selected as long as the fine particles are uniformly dispersed in the solvent. Specifically, it is preferable to use a wet medium mill such as a bead mill or a ball mill.

When the concentration of the hexaboride fine particles in the third dispersion liquid is 5 mass % or more, productivity in manufacturing the anti-counterfeit ink composition for offset printing is excellent. In contrast, when the concentration of the hexaboride fine particles is 50 mass % or less, the viscosity of the third dispersion liquid is not excessively high, thus facilitating the pulverization and dispersion of the hexaboride fine particles.

From this viewpoint, the concentration of the hexaboride fine particles in the third dispersion liquid is preferably from 5 to 50 mass %, more preferably from 10 to 40 mass %, still more preferably from 20 to 30 mass %.

When increase of the viscosity of the mixed solvent in which the hexaboride fine particles are added is desired to be further suppressed, it is also preferable to add the abovementioned dispersant. As a method for adding the dispersant, the dispersant may be added to the mixed solvent before the operation of dispersing the hexaboride fine particles.

Next, the first solvent is removed from the Mixed solvent in which the hexaboride fine particles are dispersed, and the first solvent content in the mixed solvent in which the hexaboride fine particles are dispersed is set to 5 mass % or less, to obtain the near infrared absorbing fine particle dispersion liquid of the present invention.

For removing the first solvent from the mixed solvent in which the hexaboride fine particles are dispersed, it is preferable to use a heat distillation method to which the depressurizing operation is also added, using a difference in boiling point between the first and second solvents.

Specifically, in the heat distillation method to which the depressurizing operation is also added, the second dispersion liquid is distilled under reduced pressure while stirring, and the first solvent is separated from the second dispersion liquid. Vacuum stirring type dryers can be cited as apparatuses used for heat distillation to which the depressurizing operation is also added, but there is no particular limitation as long as the apparatus has the above functions. The temperature during the heat distillation is preferably from 35 to 200° C. The temperature is more preferably from 40 to 150° C., and particularly preferably from 60 to 120° C. When the temperature during heating distillation is 35° C. or more, a solvent removal rate can be guaranteed. Meanwhile, when the temperature during heating distillation is 200° C. or less, it is possible to avoid a situation such that the dispersant is deteriorated.

When the depressurizing operation is used in combination with the abovementioned heating distillation, the degree of vacuum is −0.05 MPa or less, more preferably −0.06 MPa or less at gauge pressure. When the gauge pressure is −0.05 Mpa or less, the removal speed of the first solvent becomes fast and the productivity is good.

By applying the vacuum distillation method, the solvent removal efficiency is improved and the near infrared absorbing fine particle dispersion liquid of the present invention is not exposed to a high temperature for a long time, agglomeration of the dispersed hexaboride fine particles and deterioration of the second solvent do not occur, which is preferable. Further, productivity is also increased, and an evaporated organic solvent can be easily recovered, which is preferable from the viewpoint of environmental consideration.

5. Near Infrared Absorbing Fine Particle Dispersion Liquid

By the production method described above, the near infrared absorbing fine particle dispersion liquid of the present invention is obtained.

The higher the concentration of hexaboride fine particles is in the near infrared absorbing fine particle dispersion liquid of the present invention, the easier it is to prepare the anti-counterfeit ink for offset printing, which is preferable.

Meanwhile, the higher the concentration of the hexaboride fine particles is, the lower the fluidity of the hexaboride fine particle dispersion liquid becomes. However, in the abovementioned production method, it is sufficient if the fluidity is such that the produced hexaboride fine particle dispersion liquid can be recovered.

From this viewpoint, in the near infrared absorbing fine particle dispersion liquid of the present invention, a preferable concentration of hexaboride fine particles is 25 mass % or more and 75 mass % or less, more preferably 25 mass % or more and 50 mass % or less, further preferably 30 mass % or more and 45 mass % or less.

Meanwhile, the dispersed particle size of the hexaboride fine particles can be arbitrarily controlled by the treatment time using the abovementioned wet type medium mill. Namely, by increasing the treatment time, the dispersed particle size can be small.

A lower limit value of the viscosity of the near infrared absorbing fine particle dispersion. liquid of the present invention depends on the viscosity of the used vegetable oils or the vegetable oil-derived compounds. For example, the viscosity (24° C.) of sunflower oil is 50 mPa/S and the viscosity of linseed oil (24° C.) is 40 mPa/S, and the viscosity of tong oil (24° C.) is 210 mPa/S.

A binder may be further added to the near infrared absorbing fine particle dispersion liquid of the present invention. The binder is not particularly limited, and for example, synthetic resins such as rosin-modified phenol resin, rosin-modified alkyd resin and petroleum resin-modified phenolic resin, can he mentioned. Therefore, the binder suitable for the purpose can be selected.

6. Anti-Counterfeit Ink Composition for Offset Printing

The anti-counterfeit ink composition for offset printing can be obtained by mixing the near infrared absorbing fine particle dispersion liquid, a resin varnish component, a vegetable oil component, a petroleum solvent component, and an additive agent of the present invention.

As the resin varnish component, arbitrary resin system such as phenol resin, petroleum resin, rosin modified phenol resin, petroleum resin modified rosin modified phenol resin, vegetable oil modified rosin. modified phenol resin, modified alkyd resin, rosin modified maleic acid resin, polyester resin, acrylic resin, urethane resin, and epoxy resin, etc., are preferably used, and for example, a resin varnish using rosin modified phenol resin or petroleum resin is preferably used, An addition amount of the resin varnish in the lithographic offset printing ink composition is 15 to 70 mass %, preferably 40 to 60 mass %. Further, as the vegetable oil component and the petroleum solvent component, any one of those generally used for the lithographic offset ink may be used.

Plasticizers, oxidant inhibitors, thickeners, waxes and the like can be mentioned as the additive agent.

Further, in the anti-counterfeit ink composition for offset printing of the present invention, it is possible to form a colored pattern in the visible light region by adding a pigment used for a general lithographic offset ink. By forming the colored pattern, an effect in terms of a design can be enhanced, and an anti-counterfeit effect can be enhanced, As the abovementioned pigment, any pigment may be used as long as it does not impair printing suitability. Specifically, various organic pigments such as azo lake pigment, insoluble azo pigment, condensed azo pigment, phthalocyanine pigment, condensed polycyclic pigment and the like can be used. In addition to the organic pigment, various inorganic pigment including carbon black, white pigments such as titanium oxide and white lead, extender pigments such as calcium carbonate, red pigments such as red iron oxide, yellow pigments such as yellow lead, green pigments such as chromium oxide, blue pigments such as ultramarine, purple pigment such as manganese violet, and fluorescent pigment, temperature-indicating pigment, pearl pigment, metal powder pigment and the like, can be used.

Further, it is also preferable to use carbon black alone.

In the anti-counterfeit ink composition for offset printing of the present invention, as described above, it is possible to simultaneously use the near infrared absorbing fine particles and the pigment used for a general lithographic offset ink. By adopting such a configuration, a color difference from ordinary offset ink not containing the near infrared absorbing fine particles, can be small enough so that it cannot be visually discriminated.

The near infrared absorbing fine particle dispersion liquid, the resin varnish component, the petroleum solvent component, the additive, and/or the pigment of the present invention can be kneaded using a kneading machine such as a triple roll mill and the like. At that time, wetting varnishes such as alkyd resin and other additives that are excellent in wetting properties of an infrared absorbing agent may be used in order to increase the degree of kneading and to improve working efficiency.

7. Printing Method

As a printing method for providing the printed matter of the present invention, a conventionally known lithographic offset printing method is used, For example, offset sheet-fed printing, offset rotary printing, waterless offset printing, dry offset printing, and the like can be mentioned.

As a base material used in the printed matter of the present invention, for example, white paper, a plastic film printed in white, and the like can be mentioned. As the plastic film in this case, polypropylene (PP), polyvinyl chloride (PVC), polyethylene terephthalate (PET), synthetic paper and the like can be mentioned. Depending on the purpose of use of the finished product, it is considered that there is a superiority of paper and film respectively, although it cannot be said which is good unconditionally. However, in the example of the present invention described later, white pure paper is chosen because of inexpensiveness and ease of handling.

As an anti-counterfeit ink set for offset printing of the present invention, conventionally known lithographic offset printing ink is used. For example, oxidation polymerization type ink, heat set type ink, osmotic drying type ink and the like can be mentioned.

Further, conventionally known plate making technology is also used for a plate used for printing.

For example, a plate formed by amplitude modulation screening (AM screening) method, a plate formed by frequency modulation screening (FM screening) method, and the like can be mentioned.

By printing using the anti-counterfeit ink composition for offset printing of the present invention, a printed matter which is less restricted in design and also excellent in the anti-counterfeit effect can be provided.

8. Authenticity Judging Method

The printed matter of the present invention is irradiated with the near infrared rays having a wavelength of 800 nm to 1300 nm, and the near infrared rays having the abovementioned wavelength diffusely reflected from the printed matter are measured. The printed matter of the present invention has less diffuse reflection of near infrared rays having a wavelength of 800 nm to 1300 nm as compared with a blank printed matter not containing the near infrared absorbing fine particles. Therefore, based on a difference between a diffuse reflectance of the printed matter containing the near infrared absorbing fine particles for reflecting the near infrared ray having a wavelength of 800 nm to 1300 nm, and a diffuse reflectance of the blank printed matter for reflecting the near infrared ray having a wavelength of 800 nm to 1300 nm, the authenticity of the printed matter can be easily judged. For example, by dividing a diffuse reflectance value of the printed matter of the present invention in a wavelength range of 800 nm to 1300 nm, by a diffuse reflectance value of the blank printed matter in a wavelength range of 800 nm to 1300 nm, it is possible to evaluate a net diffuse reflectance of the near infrared absorbing fine particles excluding factors such as the binder and other factors and the base material. The smaller this divided value is, the easier the authenticity is judged, and 0.84 or less is preferable, 0.77 or less is more preferable.

In order to decrease the value obtained by dividing the diffuse reflectance value of the printed matter containing the near infrared absorbing fine particles, by the diffuse reflectance value of the blank printed matter, it can he considered that the content of the near infrared absorbing fine particles may be increased, and the concentration of the near infrared absorbing fine particles in the ink may be increased. However, there is a limit in terms of ink stability and cost. In addition, it can be considered that a film thickness is thickened by overcoating the ink. However, there is a concern that influences such as an increase in man-hours and unevenness on a printed surface due to thickening of the film thickness, etc. are caused.

Accordingly, it is preferable that an amount of the near infrared absorbing fine particles contained in the printed matter is small, thus leading to use of the near infrared absorbing fine particles of the present invention. Specifically, the amount of the near infrared absorbing fine particles contained in the printed matter is preferably 0.8 g/cm$^2$ or less.

The diffuse reflectance of the present invention is obtained by measuring a relative value of the diffuse reflectance in a wavelength region of 800 nm to 1300 nm, with respect to the diffuse reflectance of a white plate formed by solidifying barium sulfate fine powder, which is adjusted to 100% using a spectrophotometer.

EXAMPLES

The present invention will be specifically described hereafter with reference to examples, but the present invention is not limited to these examples.

A method for measuring the acid value of the near infrared absorbing fine particle dispersant of this example complies with JIS K 0070, and performed by a potentiometric titration method. Further, a method for measuring the viscosity of the near infrared absorbing fine particle dispersion liquid of this example was measured using a vibration type viscometer VM 100 A-L (manufactured by CBC Materials Co, Ltd,). Further, measurement was performed under the condition of using CuKα ray using a fine particle X-ray diffractometer (D2 PHASER manufactured by Bruker AXS Co., Ltd.), to thereby obtain an XRD pattern of 2θ=10° to 100°, and Rietveld analysis was performed based on the XRD pattern to thereby obtain a lattice constant of the near infrared absorbing fine particles of this examples.

Then, optical properties of the printed matter of this example were measured using a spectrophotometer U-4100 (manufactured by Hitachi, Ltd.). The diffuse reflectance was measured as follows: a spectrophotometer U-4100 (manufactured by Hitachi, Ltd.) was prepared so that the diffuse reflectance of a white board on which fine powder of barium sulfate has been hardened was adjusted to 100%, and the diffuse reflectance was measured as a relative value of every 5 nm in a wavelength region of 800 nm to 1300 nm, and an average value of the obtained values was used.

Example 1

20.0 mass % of lanthanum hexaboride fine particles (average particle size: 1 to 2 µm) as near infrared absorbing fine particles, 10.0 mass % of a dispersant (abbreviated as dispersant "a" hereafter) having a fatty acid in its structure, having an amino group, having an acid value of 20.3 mg KOH/g, having a hydroxystearic acid chain, and having a nonvolatile content of 100%, and 70.0 mass % of methyl isobutyl ketone (abbreviated as MIBK hereafter) as a solvent, were weighed.

These hexaboride fine particles, dispersant, and solvent were charged in a paint shaker containing 0.3 mmφ ZrO$_2$ beads, pulverized and dispersed for 30 hours, to thereby obtain a hexaboride fine particle dispersion liquid (abbreviated as dispersion liquid A hereafter) of example 1.

Further, 36.6 parts by weight of tung oil was mixed and added to 100 parts by weight of solution A, and next, using a stirring vacuum dryer (Ishikawa vacuum evacuator manufactured by Ishikawa Factory), heated distillation was also performed at 80° C. for 1 hour under reduced pressure operation (−0.08 MPa under gauge pressure), and MIBK was removed to thereby obtain a hexaboride fine particle dispersion liquid (hereinafter abbreviated as dispersion liquid B). The concentration of the lanthanum hexaboride fine particles in the dispersion liquid B was 29.6 mass %.

Here, an amount of residual MIBK in the dispersion liquid B was measured using a dry moisture meter (MCHC-120H: manufactured by Shimadzu Corporation), and it was found to be 1.5 mass %. The dispersed particle size of the hexaboride fine particles in the dispersion liquid B was measured by a particle size distribution meter manufactured by Otsuka Electronics Co., and it was found to be 84.6 nm. The lattice constant was 0.41560 nm.

The results are shown in table 1 (also shown in examples 2, 3, 4 and comparative example 1 hereafter).

A transparent PET film having a thickness of 50 µm was prepared as a substrate to be printed and the dispersion liquid B was formed on the surface thereof with a bar coater to a thickness of 8 µm. This film was heated at 70° C. for 3 hours to dry the dispersion liquid B.

The dried film of the dispersion liquid B thus obtained had a visible light transmittance of 69.6%. Further, the transmittance at a wavelength of 550 nm in a visible light region was 71.5%, the transmittance at a wavelength of 800 nm was 30.6%, the transmittance at a wavelength of 900 nm was 22.3%, the transmittance at a wavelength of 1000 nm was 20.2%, and the transmittance at a wavelength of 1500 nm was 71.0% in a near infrared region. The transmission profile of the dried film of the dispersion liquid B is shown in FIG. 1 and the measurement results are shown in table 1 (also shown in examples 2, 3, and 4 hereafter)

Example 2

A hexaboride fine particle dispersion liquid (abbreviated as a dispersion liquid C hereafter) of example 2 was obtained in the same manner as in example 1 except that 10.0 parts by weight of tung oil was added to 100 parts by weight of solution A. The concentration of lanthanum hexaboride fine particles in the dispersion liquid C was 29.2 mass %.

An amount of residual MIBK in the dispersion liquid C was measured using a dry moisture meter, and it was found to be 2.6 mass %. The dispersed particle size of each hexaboride fine particle in the dispersion liquid C was measured using a particle size distribution meter manufactured by Otsuka Electronics Co., and it was found to be 84.3 nm. Further, the lattice constant was 0.41560 nm.

Next, a dried film of example 2 was obtained in the same manner as in example 1, and optical properties were measured.

Figure 2:
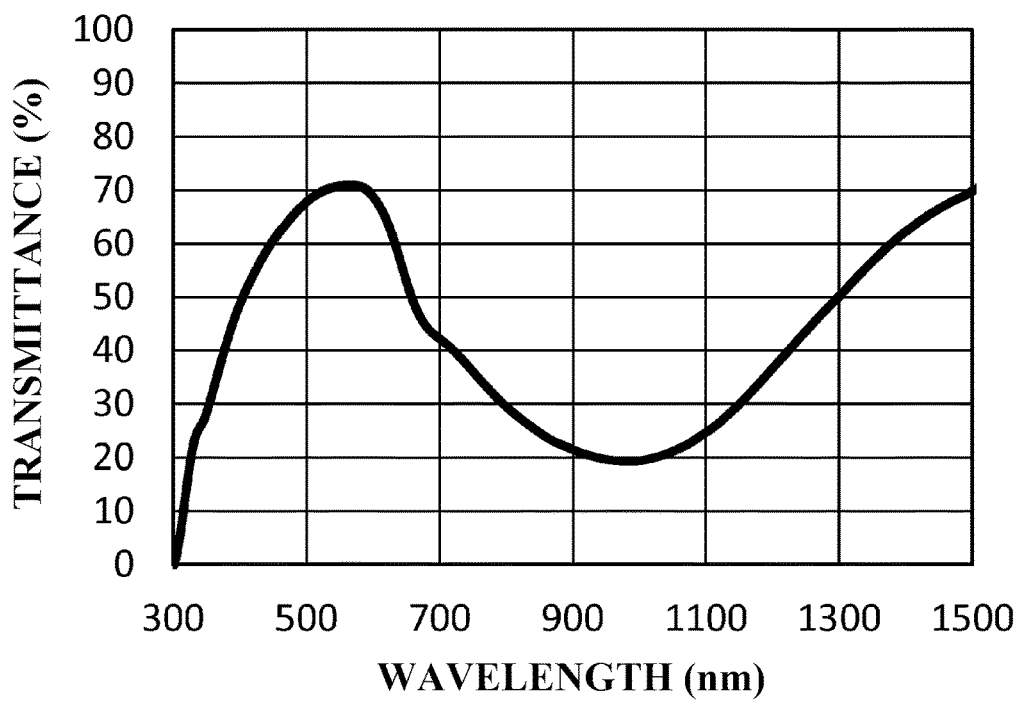
FIG. 2 is a light transmission profile of a dried film of a dispersion liquid C according to the present invention.

The obtained dried film had a visible light transmittance of 68.8%. Further, the transmittance at a wavelength of 550 nm in the visible light region was 70.8%, the transmittance at a wavelength of 800 nm was 29.5%, the transmittance at a wavelength of 900 nm was 21.4%, the transmittance at a wavelength of 1000 nm was 19.3%, and the transmittance at a wavelength of 1500 nm was 69.8% in the near infrared region. The transmission profile of the dried film of this dispersion liquid C is shown in FIG. 2.

Example 3

A hexaboride fine particle dispersion liquid of example 3 (abbreviated as a dispersion liquid D hereafter) was obtained in the same manner as in example 1 except that 36.6 parts by weight of linseed oil was added and mixed to 100 parts by weight of solution A. The concentration of lanthanum hexaboride fine particles in dispersion liquid D was 29.6 mass %.

An amount of residual MIBK in the dispersion liquid D was measured using a dry moisture meter, and it was found to be 1.5 mass %. The dispersed particle size of each hexaboride fine particle in the dispersion liquid D was measured using a particle size distribution meter manufactured by Otsuka Electronics Co., and it was found to be 84.5 nm. Further, the lattice constant was 0.41560 nm.

Next, in the same manner as in example 1, a dried film of example 3 was obtained and the optical properties were measured.

Figure 3:
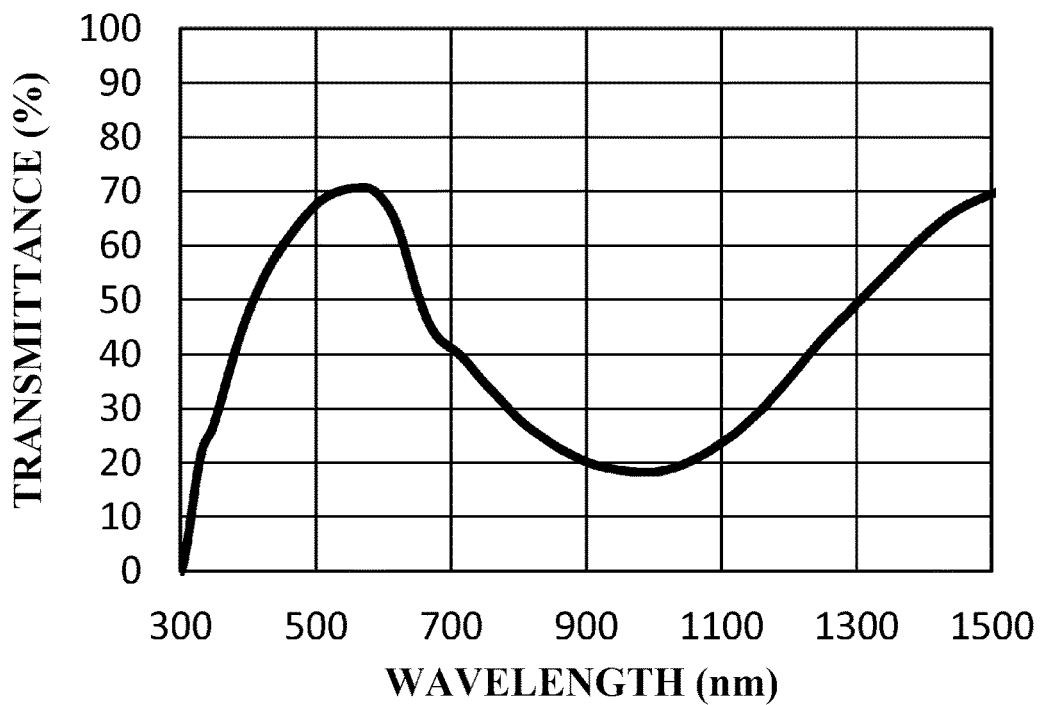
FIG. 3 is a light transmission profile of a dried film of a dispersion liquid D according to the present invention.

The obtained dried film had a visible light transmittance of 68.4%. Further, the transmittance at a wavelength of 550 nm in the visible light region was 70.5%, the transmittance at a wavelength of 800 nm was 28.1%, the transmittance at a wavelength of 900 nm was 20.1%, the transmittance at a wavelength of 1000 nm was 18.2% and the transmittance at a wavelength of 1500 nm was 69.4% in the near infrared region. The transmission profile of the dried film of this dispersion liquid D is shown in FIG. 3.

Example 4

In the same manner as in example 1 except that 20 mass % of lanthanum hexaboride fine particles (average particle size of 1 to 2 μm) as near infrared absorbing fine particles, 10 mass % of dispersant "a" as a dispersant, and 70.0 mass % of propylene glycol monomethyl ether acetate (abbreviated as PGM-Ac hereafter) were weighed, to thereby obtain a hexaboride fine particle dispersion liquid (abbreviated as a dispersion liquid E hereafter) of example 4.

Next, in the same manner as in example 1 except that the dispersion liquid E was used, a hexaboride fine particle dispersion liquid (abbreviated as a dispersion liquid F hereafter) of example 4 was obtained. The concentration of lanthanum hexaboride fine particles in the dispersion liquid F was 29.3 mass %.

An amount of residual. PGM-Ac in the dispersion liquid F was measured using a dry moisture meter, and it was found to be 2.3 mass %. The dispersed particle size of each hexaboride fine particle in the dispersion liquid F was measured using a particle size distribution meter manufactured by Otsuka Electronics Co., and it was found to be 84.7 nm, and a lattice constant was 0.41560 nm.

Next, in the same manner as in example, a dried film was obtained and the optical properties were measured.

Figure 4:
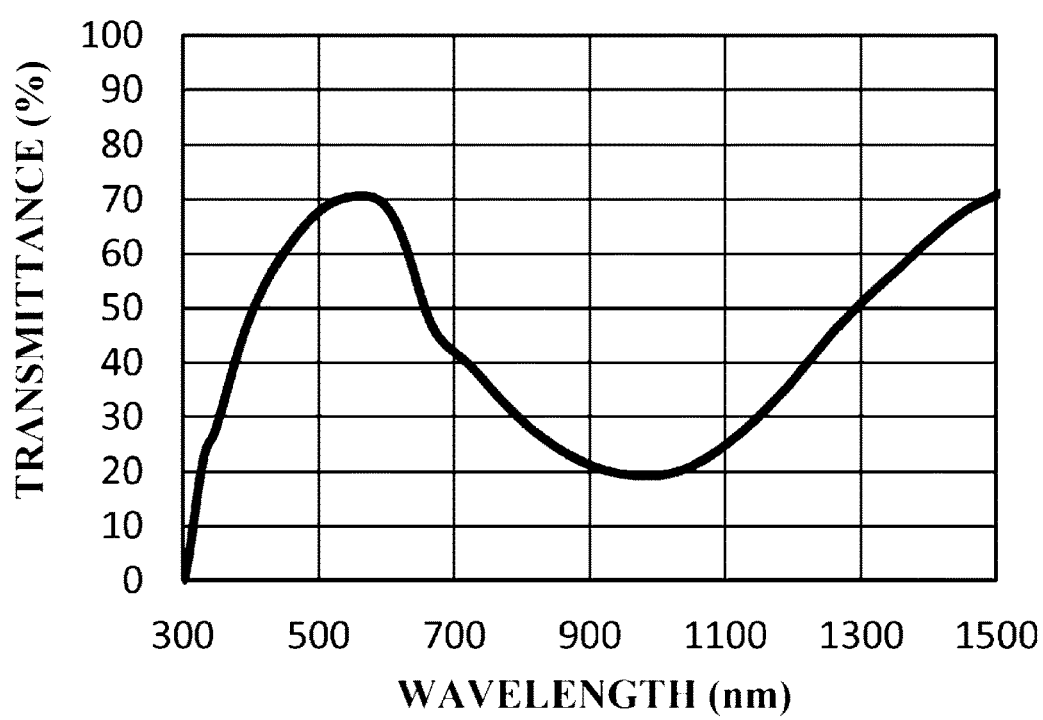
FIG. 4 is a light transmission profile of a dried film of a dispersion liquid F according to the present invention.

The obtained dried film had a visible light transmittance of 68.5%. Further, the transmittance at a wavelength of 550 nm in the visible light region was 70.6%, the transmittance at a wavelength of 800 nm was 29.3%, the transmittance at a wavelength of 900 nm was 21.2%, the transmittance at a wavelength of 1000 nm was 19.2%, and the transmittance at a wavelength of 1500 nm was 70.8% in the near infrared region. FIG. 4 shows a transmission profile of the dried film of the dispersion liquid F.

Comparative Example 1

20 mass % of lanthanum hexaboride fine particles (average particle size of 1 to 2 μm) as near infrared absorbing fine particles, 10 mass % of dispersant "a" as a dispersant, 70 mass % of ethylene glycol having a boiling point of 197° C. as a solvent (abbreviated as E.G. hereafter) were weighed.

In the same manner as in example 1 except that these hexaboride fine particles, dispersant and solvent were charged in a paint shaker containing 0.3 mmφ $ZrO_2$ beads and pulverized and dispersed for 30 hours to obtain a dispersion liquid of hexaboride fine particles of comparative example 1 (abbreviated as a dispersion liquid G hereafter), a hexaboride fine particle dispersion liquid (abbreviated as a dispersion liquid H hereafter) of comparative example 1 was obtained. The concentration of the lanthanum hexaboride fine particles in the dispersion liquid H was 19.0 mass %.

An amount of residual E.G. in the dispersion liquid H was measured using a dry moisture meter, and it was found to be 36.7 mass %.

The dispersed particle size of each hexaboride fine particle in the dispersion liquid H was measured using a particle size distribution meter manufactured by Otsuka Electronics Co., and it was found to be 83.7 nm. Further, the lattice constant was 0.41560 nm.

Next, in the same manner as in example 1 except that the dispersion liquid H was used, a dried film of comparative example 1 was prepared. However, due to large content of E. G, a dried film could not be obtained and the optical properties could not be measured.

(Evaluation of Examples 1 to 4)

In examples 1 to 4, the content of the first solvent in the second dispersion liquid in which the hexaboride fine particles were dispersed in the vegetable oil was less than 5 mass %.

Further, the dried films of examples 1 to 4 show high transmittance in the visible light region and the transmittance is remarkably low in the near infrared region.

As a result, it was confirmed that the printed pattern prepared using the near infrared absorbing fine particle dispersion liquid of the present invention can be distinguished by a near infrared ray discriminating machine.

Example 5

An example of preparing an anti-counterfeit ink B for offset printing (abbreviated as an ink B hereafter) using the dispersion liquid B prepared in example 1, and a printing example using the ink B will be described. However, the range of the present invention is not limited to the description of these examples.

(Preparation of Rosin-Modified Phenolic Resin)

1000 parts by weight of P-octylphenol, 850 parts by weight of 35% formalin, 60 parts by weight of 93% sodium hydroxide, and 1000 parts by weight of toluene, were charged in a four-necked flask equipped with a stirrer, a condenser, and a thermometer. Then, a mixture was allowed to react at 90° C. for 6 hours. Thereafter, a hydrochloric acid solution of 125 parts by weight of 6N hydrochloric acid and 1000 parts by weight of water was added, and after being stirred and left to stand, an upper layer part was taken out. Then, 2000 parts by weight of a toluene solution of a resol type phenol resin having a 49% nonvolatile content was obtained, which was used as a resol liquid.

1000 parts by weight of gum rosin was charged in a four-necked flask equipped with a stirrer, a cooler with a moisture separator, and a thermometer, and dissolved at 200° C. while blowing a nitrogen gas therein, 1,800 parts by weight of the resol liquid obtained above was added thereto, and the mixture was allowed to react at 230° C. for 4 hours while removing toluene. After the reaction, 110 parts by weight of glycerin was added and. reacted at 250° C. for 10 hours so that the acid value was adjusted to 20 mg KOH/g or less, to thereby obtain a rosin-modified phenol resin having a weight average molecular weight of 50000, an opaque temperature of 88° C. in AF Solvent No. 6 produced by Nippon Petrochemical Co., Ltd.

(Preparation of Varnish)

40 parts by weight of the rosin-modified phenol resin, 35 parts by weight of soybean oil, 24 parts by weight of AF Solvent No, 6 (solvent manufactured by Nippon Petrochemical Co., Ltd.), 1.0 part by weight of ALCH (gelling agent manufactured by Kawaken Fine Chemicals Co., Ltd.) were heated and stirred at 190° C. for 1 hour, to thereby obtain a varnish.

(Preparation of Anti-Counterfeit Ink for Offset Printing)

In a formulation shown in table 2, the dispersion liquid B prepared in example 1, a varnish, a petroleum solvent (AF-6 Solvent manufactured by Nippon Oil Corporation), soybean oil, tung oil, compound (manufactured by GODO Ink: UG compound), a metal drier (937 dryer manufactured by DIC Graphics Co., Ltd.), and a drying inhibitor (INKEEPER manufactured by Tokyo Ink Co., Ltd.) were mixed, to thereby obtain an ink B. The concentration of lanthanum hexaboride in the ink B was 0.38 mass %. The obtained offset printing ink did not cause agglomeration or the like and was stable.

(Preparation of the Printed Matter)

White fine high-quality paper was prepared as a base material to be printed and offset printing was performed using the ink B, to thereby obtain a printed matter B. An average value of the diffuse reflectance of the obtained printed matter B in the wavelength range of 800 nm to 1300 nm was 60.0%.

In contrast, the average value of the diffuse reflectance of the blank printed matter of comparative example 2 described later in a wavelength range of 800 nm to 1300 nm was 77.7%, Accordingly, a value obtained by dividing the average value of the diffuse reflectance of the printed matter B of example 5 in the wavelength range of 800 nm to 1300 nm, by the average value of the diffuse reflectance of the blank printed matter of comparative example 2 in the wavelength range of 800 nm to 1300 nm described later was 0 77.

Example 6

In the same manner as in example 5 except that the dispersion liquid B, the varnish, the petroleum solvent, the soybean oil, the tang oil, the compound, the metal drier, and the drying inhibitor prepared in example 1 were mixed in the mixture shown in table 2, an anti-counterfeit ink C (abbreviated as an ink C hereafter) for offset printing was obtained, The concentration of lanthanum hexaboride in the ink C was 0.73 mass %. White fine high-quality paper was prepared as the base material to be printed and offset printing was performed using the ink C, to thereby obtain a printed matter C. The average value of the diffuse reflectance of the obtained printed matter C in the wavelength range of 800 nm to 1300 nm was 46.3%.

Accordingly, the value obtained by dividing the average value of the diffuse reflectance of the printed matter C in the wavelength range of 800 nm to 1300 nm, by the average value of the diffuse reflectance of the blank printed matter of the comparative example 2 in the wavelength range of 800 nm to 1300 nm was 0.60.

Example 7

In the same manner as in example 5 except that the dispersion liquid B, the varnish, the petroleum solvent, the soybean oil, the tong oil, the compound, the metal drier, and the drying inhibitor prepared in example 1 were mixed in the formulation shown in table 2, an anti-counterfeit ink D (abbreviated as an ink D hereafter) for offset printing was obtained. The concentration of lanthanum hexaboride in the ink D was 1.86 mass %. White fine high-quality paper was prepared as the base material to be printed, and offset printing was performed using the ink D, to thereby obtain a printed matter D. The average value of the diffuse reflectance of the obtained printed matter D in the wavelength range of 800 nm to 1300 nm was 21.6%.

Accordingly, the value obtained by dividing the average value of the diffuse reflectance of the printed matter D in the wavelength range of 800 urn to 1300 nm, by the average value of the diffuse reflectance of the blank printed matter of comparative example 2 in the wavelength range of 800 nm to 1300 was 0.28.

Comparative Example 2

In the same manner as in example 5 except that the varnish and the petroleum solvent, soybean oil, tung oil, compound, metal drier, and drying inhibitor were mixed in the formulation shown in table 2, an anti-counterfeit ink E (abbreviated as an ink E hereafter) for offset printing was obtained. White fine high-quality paper was prepared as the base material to be printed and offset printing was performed using the ink E, to thereby obtain a printed matter E as a blank printed matter. The average value of the diffuse reflectance of the obtained printed matter E as a blank printed matter in the wavelength range of 800 nm to 1300 nm was 77.7%.

Comparative Example 3

In the same manner as in example 1 except that antimony-doped tin oxide (ATO) fine particles (average particle size: 1 to 10 μm) was used as the near infrared absorbing fine particles, a near infrared absorbing fine particle dispersion liquid (abbreviated as a dispersion liquid I hereafter) of comparative example 3 was obtained.

Next, in the same manner as in example 1 except that the dispersion liquid I was used, an antimony-doped tin oxide fine particle dispersion liquid (abbreviated as a dispersion liquid J hereafter) of comparative example 3 was obtained. The concentration of the antimony-doped tin oxide fine particles in the dispersion liquid J was 29.3 mass %.

Here, an amount of residual MIBK in the dispersion liquid J was measured using a dry moisture meter, and it was found to be 2.3 mass %. The dispersed particle size of each antimony-doped tin oxide fine particle in the dispersion liquid J was measured, and it was found to be 75.6 nm.

In the same manner as in example 5 except that the dispersion liquid J, the varnish, the petroleum solvent, the soybean oil, the tung oil, the compound, the metal drier, and the drying inhibitor prepared in the formulation shown in table 2 were mixed, an anti-counterfeit ink F for offset printing (abbreviated as an ink F hereafter) was obtained. White fine high-quality paper was prepared as the base material to be printed and offset printing was performed using the ink F, to thereby obtain a printed matter F. The average value of the reflectance of the obtained printed matter F in the wavelength range of 800 nm to 1300 nm was 70.3%.

Accordingly, the value obtained by dividing the average value of the diffuse reflectance of the printed matter F in the wavelength range of 800 nm to 1300 nm, by the average value of the diffuse reflectance of the blank of comparative example 2 in the wavelength range of 800 nm to 1300 nm was 0.90.

(Evaluation of examples 5 to 7 and comparative examples 2 and 3)

In examples 5 to 7, printed matters B to D containing hexaboride fine particles in the printed pattern, show low diffuse reflectance in the wavelength range of 800 to 1300 nm. The value obtained by dividing the average value of the diffuse reflectance in the wavelength range of 800 nm to 1300 nm, by the average value of the diffuse reflectance of the blank in the wavelength range of 800 nm to 1300 nm is as small as 0.28 to 0.77. As a result, it was confirmed that the authenticity of the printed matter containing hexaboride particles was easily judged.

In contrast, the printed matter E containing hexaboride fine particles in the printed pattern of comparative example 2 and the printed matter F containing antimony-doped tin oxide fine particles in the printed pattern of comparative example 3, show high diffuse reflectance in the wavelength range of 800 nm to 1300 nm. The value obtained by dividing the average value of the diffuse reflectance in the wavelength range of 800 nm to 1300 nm, by the average value of the diffuse reflectance of the blank in the wavelength range of 800 nm to 1300 nm is as large as 0.90 to 1.00, and judgment of authenticity is considered to be difficult by the reflectance in the wavelength range of 800 nm to 1300.

Further, in the case of obtaining the printed matter whose authenticity is easily judged by the printing ink containing antimony-doped tin oxide fine particles of comparative example 3, the thickness of the ink. on the surface of the printed matter is required to be increased so that it can be visually recognized, and it is considered not practical to use such a printed matter for preventing counterfeiting.

TABLE 1

| | Raw material | | | | | | A | | | | |
|---|---|---|---|---|---|---|---|---|---|---|---|
| | | | Dispersant | | | | | | | | |
| | | $LaB_6$ | | Acid | | | | | $LaB_6$ | | |
| | First solvent | content | | value | Content | Second | Dispersion | B | Content | C | D |
| | Type | (M %) | Type | (mgKOH/g) | (M %) | solvent | liquid | (M %) | (M %) | (nm) | (nm) |
| Ex. 1 | MIBK | 70 | a | 20.3 | 10 | Tung oil | B | 1.54 | 29.6 | 84.6 | 0.4156 |
| | Dispersion liquid A: 100 parts by weight | | | | | 36.6 parts by weight | | | | | |
| Ex. 2 | MIBK | 70 | a | 20.3 | 10 | Tung oil | C | 2.56 | 29.2 | 84.3 | 0.4156 |
| | Dispersion liquid A: 100 parts by weight | | | | | 10.0 parts by weight | | | | | |
| Ex. 3 | MIBK | 70 | a | 20.3 | 10 | Linseed oil | D | 1.50 | 29.6 | 84.5 | 0.4156 |
| | Dispersion liquid A: 100 parts by weight | | | | | 36.6 parts by weight | | | | | |
| Ex. 4 | PGM-Ac | 70 | a | 20.3 | 10 | Tung oil | F | 2.30 | 29.3 | 84.7 | 0.4156 |
| | Dispersion liquid E: 100 parts by weight | | | | | 36.6 parts by weight | | | | | |
| Com. Ex. 1 | E. G. | 70 | a | 20.3 | 10 | Tung oil | H | 36.7 | 19.0 | 83.7 | 0.4156 |
| | Dispersion liquid G: 100 parts by weight | | | | | 36.6 parts by weight | | | | | |

| | Optical property | | | | | |
|---|---|---|---|---|---|---|
| | | Transmittance in each wavelength | | | | |
| | E (%) | 550 nm (%) | 800 nm (%) | 900 nm (%) | 1000 nm (%) | 1500 nm (%) |
| Ex. 1 | 69.6 | 71.5 | 30.6 | 22.3 | 20.2 | 71.0 |
| Ex. 2 | 68.8 | 70.8 | 29.5 | 21.4 | 19.3 | 69.8 |

TABLE 1-continued

|  |  |  |  |  |  |  |
|---|---|---|---|---|---|---|
| Ex. 3 | 68.4 | 70.5 | 28.1 | 20.1 | 18.2 | 69.4 |
| Ex. 4 | 68.5 | 70.6 | 29.3 | 21.2 | 19.2 | 70.8 |
| Com. Ex. 1 | — | — | — | — | — | — | a: Dispersant having a fatty acid in its structure, an amino group, an acid value of 20.3 mgKOH/g, a hydroxystearic acid chain and a nonvolatile content of 100%
Ex. = Example
Com. Ex. = Comparative Example
M % = Mass %
A = Physical property of dispersion liquid
B = Residual amount of the first solvent
C = Dispersed particle size
D = Lattice constant
E = Visible light transmittance

TABLE 2

|  | Ex. 5 Ink B | Ex. 6 Ink C | Ex. 7 Ink D | Com. Ex. 2 Ink E | Com. Ex. 3 Ink F |
|---|---|---|---|---|---|
| Dispersion liquid B (mass %) | 1.3 | 2.5 | 6.3 | — | — |
| Dispersion liquid F (mass %) | — | — | — | — | 6.3 |
| Varnish (mass %) | 72.3 | 71.4 | 68.7 | 73.2 | 68.7 |
| Petroleum solvent (mass %) | 7.7 | 7.6 | 7.3 | 7.8 | 7.3 |
| Drying inhibitor (mass %) | 1.2 | 1.1 | 1.1 | 1.2 | 1.1 |
| Soybean oil (mass %) | 3.6 | 3.6 | 3.5 | 3.7 | 3.5 |
| Tung oil (mass %) | 3.6 | 3.6 | 3.5 | 3.7 | 3.5 |
| Compound (mass %) | 8.5 | 8.4 | 8.1 | 8.6 | 8.1 |
| Metal drier (mass %) | 1.8 | 1.8 | 1.7 | 1.8 | 1.7 |
| Sum (mass %) | 100 | 100 | 100 | 100 | 100 |
| $LaB_6$ concentration (mass %) | 0.38 | 0.73 | 1.86 | — | — |
|  | Printed matter B | Printed matter C | Printed matter D | Printed matter E* | Printed matter F |
| Average diffuse reflectance (%) | 60.0 | 46.3 | 21.6 | 77.7* | 70.3 |
| Average diffuse reflectance (compared with blank) | 0.77 | 0.60 | 0.28 | 1.00* | 0.90 |

Printed matter E*: Blank printed matter
Ex. = Example
Com. Ex. = Comparative Example

The invention claimed is:

1. A method for producing a near infrared absorbing fine particle dispersion liquid, comprising:

mixing and dispersing near infrared absorbing fine particles of hexaboride fine particles expressed by a general formula $XB_a$ (wherein element X is one or more kinds selected from the group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$) in a solvent of one or more kinds selected from the group consisting of alcohols, ethers, esters, ketones, aromatic hydrocarbons and glycol ethers and having a boiling point of 180° C. or less, to thereby obtain a first dispersion liquid;

adding and mixing a solvent of vegetable oils or vegetable oil-derived compounds in the first dispersion liquid, to thereby obtain a second dispersion liquid; and removing from the second dispersion liquid the solvent of one or more kinds selected from the group consisting of alcohols, ethers, esters, ketones, aromatic hydrocarbons and glycol ethers and having a boiling point of 180° C. or less, so that a content of the solvent becomes 5 mass % or less.

2. The method for producing the near infrared absorbing fine particle dispersion liquid according to claim 1, wherein a concentration of the near infrared absorbing fine particles in the first dispersion liquid is 5 mass % or more and 50 mass % or less.

3. A method for producing a near infrared absorbing fine particle dispersion liquid, comprising:

mixing a solvent of one or more kinds selected from the group consisting of alcohols, ethers, esters, ketones, aromatic hydrocarbons and glycol ethers and having a boiling point of 180° C. or less, and a solvent of vegetable oils or vegetable oil-derived compounds, to thereby obtain a mixed solvent; and mixing and dispersing in the mixed solvent near infrared absorbing fine particles of hexaboride fine particles expressed by a general formula $XB_a$ (wherein element X is one or more kinds selected from a group consisting of La, Ce, Pr, Nd, Gd, Tb, Dy, Ho, Y, Sm, Eu, Er, Tm, Yb, Lu, Sr, and Ca, satisfying $4.0 \leq a \leq 6.2$), to thereby obtain a third dispersion liquid; and removing from the third dispersion liquid the solvent of one or more kinds selected from the group consisting of alcohols, ethers, esters, ketones, aromatic hydrocarbons and glycol ethers and having a boiling point of 180° C. or less, so that a content of the solvent becomes 5 mass % or less.

4. The method for producing the near infrared absorbing fine particle dispersion liquid according to claim 3, wherein a concentration of the near infrared absorbing fine particles in the third dispersion liquid is 5 mass % or more and 50 mass % or less.

5. The method for producing the near infrared absorbing fine particles according to claim 1, wherein a dispersant which is soluble in the solvent and has a fatty acid in its structure is added to the solvent of the vegetable oils or vegetable oil-derived compounds.

* * * * *